United States Patent
Wobben

(10) Patent No.: US 6,932,574 B2
(45) Date of Patent: Aug. 23, 2005

(54) WIND POWER INSTALLATION

(76) Inventor: Aloys Wobben, Argesstrasse 19, Aurich (DE), D-26607

(*) Notice: Subject to any disclaimer, the term of this patent is extended or adjusted under 35 U.S.C. 154(b) by 120 days.

(21) Appl. No.: 10/275,542
(22) PCT Filed: Mar. 2, 2001
(86) PCT No.: PCT/EP01/02375
§ 371 (c)(1), (2), (4) Date: May 6, 2003
(87) PCT Pub. No.: WO01/86144
PCT Pub. Date: Nov. 15, 2001

(65) Prior Publication Data
US 2003/0170122 A1 Sep. 11, 2003

(30) Foreign Application Priority Data
May 6, 2000 (DE) .......................... 100 22 128

(51) Int. Cl.[7] ................................. F03D 11/00
(52) U.S. Cl. ................ 416/146 R; 361/212; 361/216; 416/230
(58) Field of Search .................. 416/146 R, 229 R, 416/230; 361/212, 216

(56) References Cited

U.S. PATENT DOCUMENTS 4,494,009 A    1/1985   Yukl ............................ 290/55
5,716,193 A    2/1998   Mondet et al. ............ 416/134 A

FOREIGN PATENT DOCUMENTS

| DE | 11195 | 3/1880 | |
| DE | 28489 | 12/1883 | |
| DE | 44 36 197 A1 | 4/1996 | |
| DE | 197 48 716 C1 | 11/1998 | |
| EP | 0 707 145 A1 | 4/1996 | |
| EP | 718495 A1 * | 6/1996 | ........... F03D/11/00 |
| EP | 1 036 937 A2 | 9/2000 | |

* cited by examiner

Primary Examiner—Edward K. Look
Assistant Examiner—Richard A. Edgar
(74) Attorney, Agent, or Firm—Seed IP Law Group PLLC

(57) ABSTRACT

The invention concerns a wind power installation. Such wind power installations of modern type, for example one of type E-40 or E-66 from Enercon are usually equipped with a lightning protection system which is known for example from DE 44 36 197.

The present invention assists to minimise the number of interference with the electronic system by virtue of the flash-over effects at the spark path. A wind power installation comprising an arrangement for continuously discharging electrostatic charging of at least one rotor blade of a wind power installation.

23 Claims, 4 Drawing Sheets

WIND POWER INSTALLATION

BACKGROUND OF THE INVENTION

1. Field of the Invention

The invention concerns a wind power installation and in particular electrostatic discharge protection of such wind power installation.

2. Description of the Related Art

Wind power installations of modern type, for example one of type E-40 or E-66 from Enercon are usually equipped with a lightning protection system which is known for example from DE 44 36 290, DE 198 26 086, DE 195 01 267, DE 44 45 899, WO 00/14405 or WO 96/07825.

In the case of such lightning protection systems like the known systems described hereinbefore, when the rotor blade is galvanically separated from the hub the respective rotor blade can be statically charged up. That electrostatic charging of a rotor blade occurs due to the friction of the air against the rotating rotor blade of a rotor of a wind power installation. Depending on the respective air humidity or other disadvantageous weather influences the rotor blades (or the lightning protection systems thereof) charge up more quickly or more slowly. Static charging occurs until the flash-over voltage of the air gap is reached. Flash-over then takes place and the entire system or the rotor blades are discharged. Such a flash-over produces electromagnetic waves (EMC) with an extremely high band width because the flash-over occurs virtually in the form of a pulse which ideally has an extreme band width (ideally an infinite band width). These abrupt discharges which are not due to a lightning strike because of a storm but due to electrostatic charging of the rotors interfere with the entire electronic system of the wind power installation, which is in the area around the flash-over, such as for example the computers or microprocessors which control and regulate an individual rotor blade. However other electronic devices of the wind power installation are also affected, which are disposed in the pod or in the proximity of the spark flash-over path. Charging of the rotating rotor blades regularly involves flash-over effects at the spark gap with likewise regular interference with the electronics, which however is not desirable for protection of the entire electronic installation devices.

BRIEF SUMMARY OF THE INVENTION

An object of the present invention is to reduce the number of interferences with the electronic system by virtue of the flash-over effects at the spark path.

Advantageous developments are described in the appendant claims and the description.

The invention is based on the proposal of continuously discharging the electrostatic charges of the rotor blades. In this respect it is to be noted that the voltage at the spark gaps just before a flash-over can easily reach between 20 and 30 kV depending on the humidity level. Accordingly the arrangement for continuously discharging the rotor blades (discharging circuit) is preferred to satisfy two conditions, more specifically firstly the continuous discharge path must be of so low resistance that static charging of the rotor blades is avoided. Secondly, is preferred for the circuit to withstand a surge voltage at the level of 30 kV and more (such surge voltages occur in the event of lightning strikes).

DETAILED DESCRIPTION OF THE INVENTION

Figure 1:
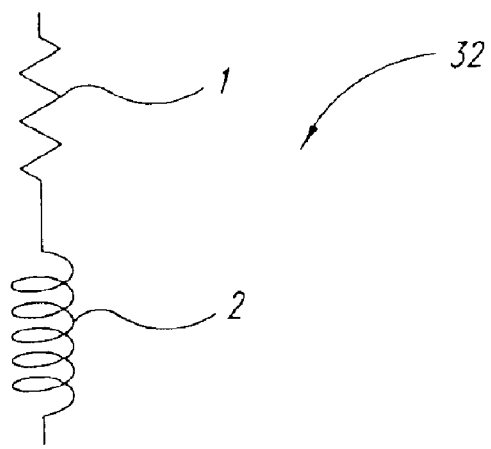
FIG. 1 is a discharging circuit which has a series resistor and inductor.

It is particularly desirable if the arrangement for continuously discharging electrostatic charging of the rotor blades comprises a discharging circuit 32 which has a series circuit of an ohmic diverter resistor 1. In one embodiment, it may also include an inductor 2. This is shown in FIG. 1. In this case the diverter resistor 1 is preferably of a value of about 50 KΩ and the inductor 2 is preferably of a value of 10 μH or more.

During static discharging of the rotor blades 5 the inductor 2 is not in operation as the diverter current represent a direct current of very small amplitude. This means that each rotor blade 5 is connected for static discharging with a resistor 1 of 50 kΩ to an earth potential when the circuit shown in FIG. 1 connects a rotor blade 5 to the earth connection of the earth potential.

In the case of a lightning strike (because of a storm) the voltage at the spark gap (the discharge circuit shown in FIG. 1) rises very high. The magnitude of the voltage is dependent on the spacing, the radius of curvature of the contact tips and the air humidity level. The inductor now limits the rise in the current which flows through the static diverter (R+L). This affords adequate passive protection for the diverter resistor.

Figure 2:
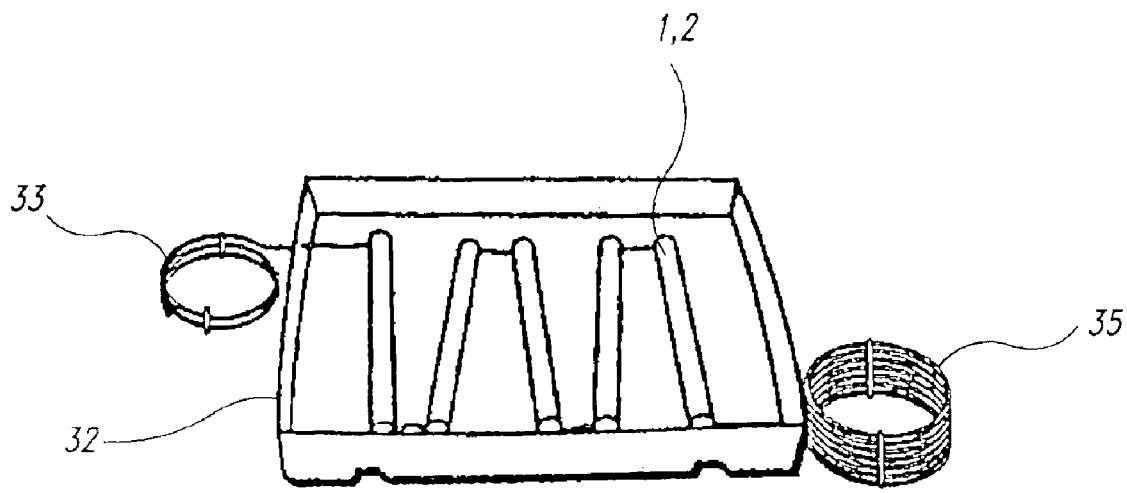
FIG. 2 is an isometric view of the discharge circuit of FIG. 1 showing the physical arrangement of the resistor and the inductor.

It is particularly advantageous if the ohmic resistor 1 is formed by a wire resistor and if the inductor 2 is wound at the same time. The ohmic resistor 1 and also the inductor 2 can be of such a configuration as to save a great deal of space. This is shown in the view in FIG. 2 of the application. Shown therein are five series-connected wound wire resistors which have suitable feed lines.

The configuration of a wound wire resistor has the advantage that it affords an identical voltage distribution over the entire length of the resistors.

A further advantage of the configuration according to the invention lies in the very simple structure which nonetheless guarantees highly effective protection for the entire electronic system of the wind power installation and affords abrupt (surge-like) discharging of electrostatic charges by means of the described static diverter.

The static diverter 32 (the arrangement for the continuous discharge of electrostatic charge) finally comprises a simple electrical impedance with an ohmic 1 and an inductive component 2 and the static diverter 32 is arranged in parallel with the spark gap.

Figure 3:
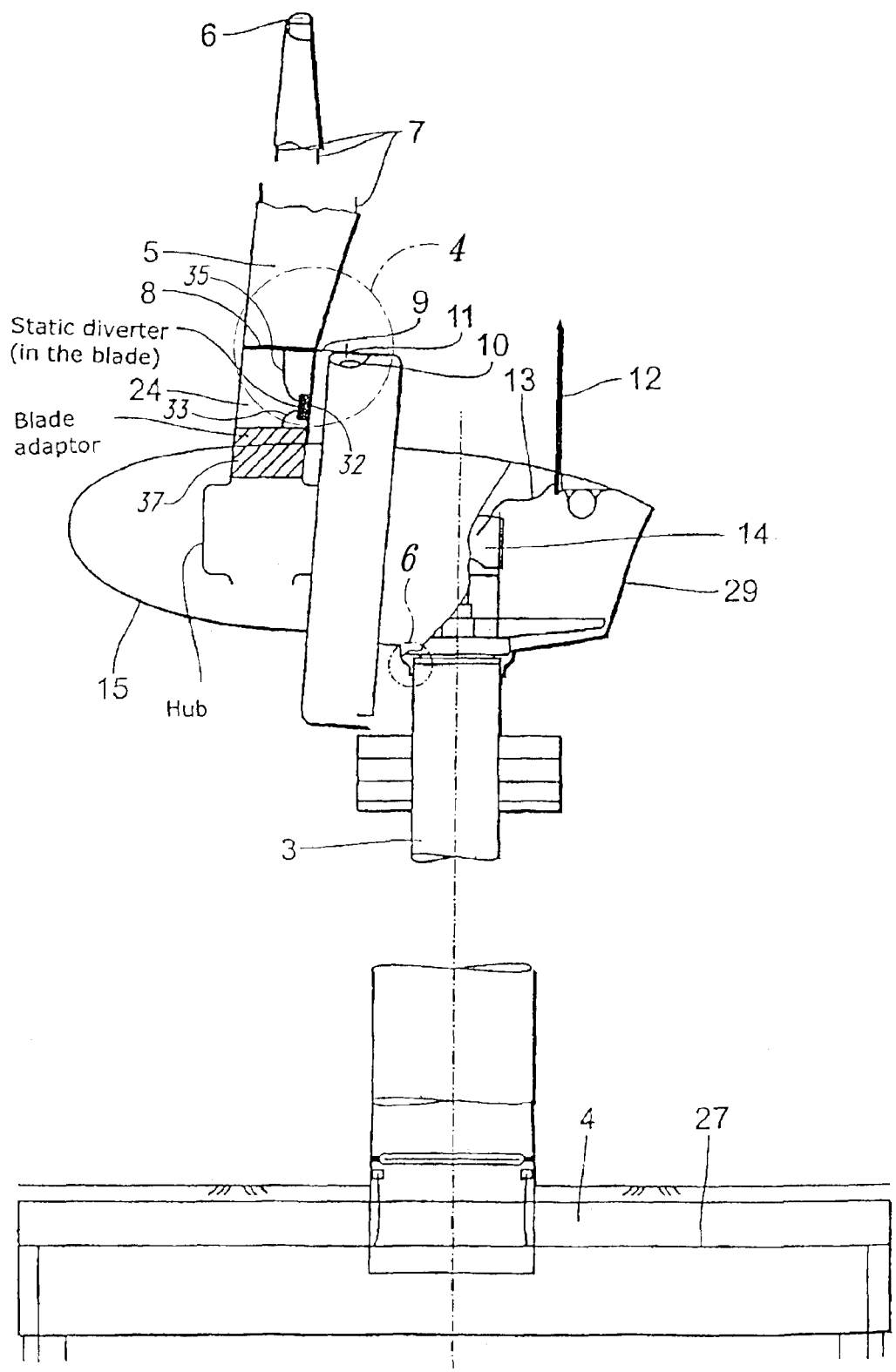
FIG. 3 shows the arrangement of the static diverter according to the invention and a wind power installation.

FIG. 3 shows the arrangement of the static diverter 32 according to the invention in a wind power installation. The wind power installation illustrated here has a machine carrier 14 which accommodates a rotor hub on which rotor blades 5 are arranged and a generator coupled to the rotor hub. The machine carrier 14 is arranged on a pylon 3 rotatably about a perpendicular axis. The pylon 3 is anchored in a foundation 4. A rotor blade 5 is illustrated for the overall view thereof. The tip of the rotor blade 5 is in the form of a shaped aluminium portion 6. Arranged on the rotor blade root 24 is an aluminium ring 8 which extends totally around the rotor blade root 24. Bar-shaped conducting elements 7 which extend in the leading edge and the trailing edge of the rotor blade electrically conductively connect the shaped aluminium portion 6 of the tip to the aluminium ring 8 arranged on the rotor blade root 24.

A lightning rod 9 is arranged as a lightning diverter member in the region of the rotor blade root 24, at the level of the aluminium ring 8. The lightning rod 9 is brought close to an electrically conductive diverter ring, as far as a predetermined spacing, for example 3 mm, by way of a transfer projection 11. With its free end remote from the projection 11 the lightning rod 9 is brought close to the aluminium ring 8, as far as a predetermined, approximately equal spacing.

The earthed diverter ring 10 is arranged coaxially with the rotor shaft. This therefore ensures that the projection 11 is brought close thereto throughout the entire rotary movement of the rotor blade 5.

Projecting above the machine rotor 14 is an additional lightning rod 12 which is connected to the machine carrier 14 with an electrically conductive connection 13.

The static diverter is conductively arranged between the aluminium ring 8 and the blade adapter 37. Static charge discharge in respect of the rotor blades can be effected by way thereof, as described above.

Figure 4:
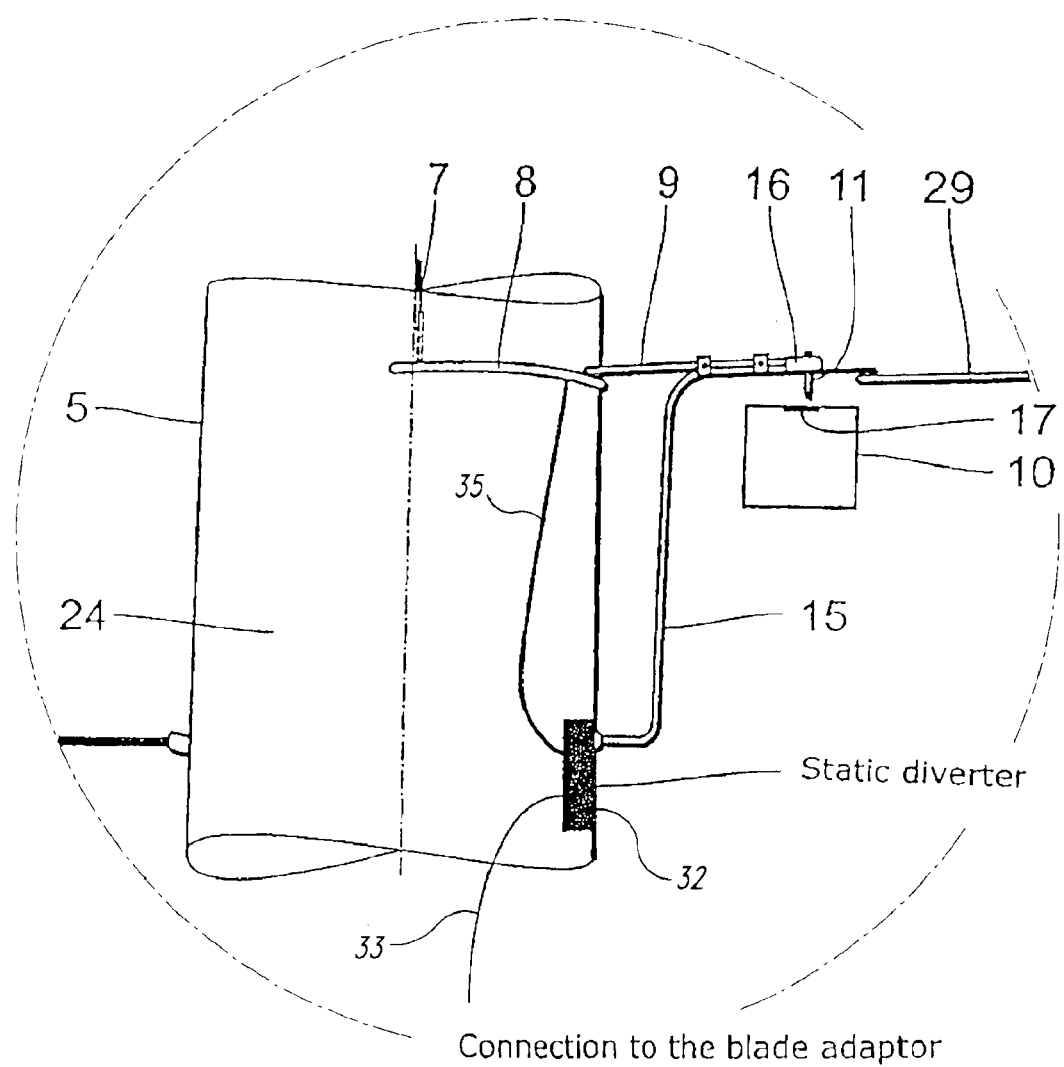
FIG. 4 is a portion indicated by the circle labeled 4 from FIG. 3.

The view shown in FIG. 3 is illustrated once again in FIG. 4 on an enlarged scale.

In this case the horizontal aluminium ring 8 is taken only around a portion of the rotor blade root. The lower end of the conductor element 7 of the illustrated support arrangement is electrically conductively connected to the aluminium ring 8. The electrically conductive lightning diverter path between the aluminium ring 8 and the diverter ring 10 is produced by the lightning rod 9 which is fixed in a horizontally lying position by clips or the like on the rotor hub casing 15 of electrically non-conductive material and thus rotates with the rotor blade 5. Arranged at the end of the lightning rod 9, which is remote from the rotor blade 5, is a cross connector 16 which connects the lightning rod 9 to the transfer projection 11. The projection 11 is brought close to the diverter ring 10 as far as a given spacing perpendicularly through the rotor hub casing 15.

Figure 5:
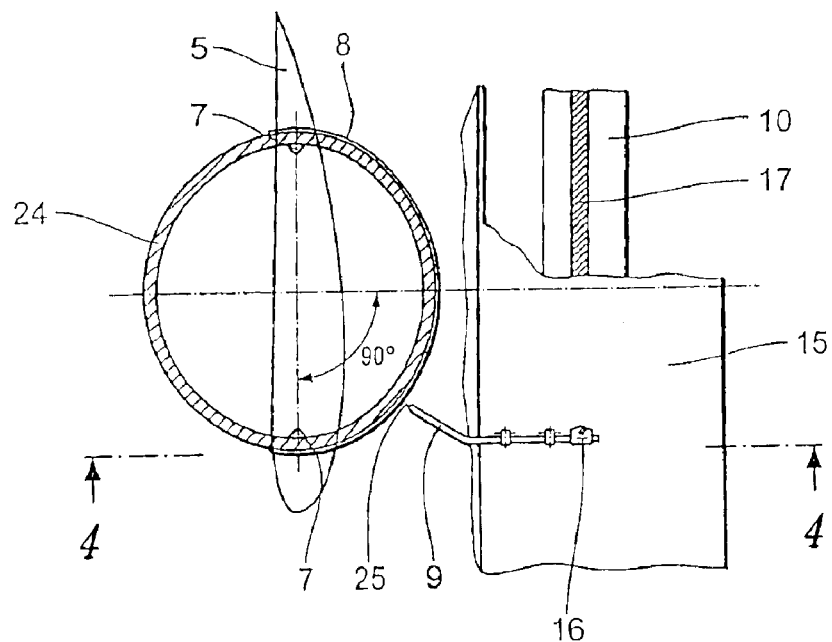
FIG. 5 is a top view of FIG. 3.

The view illustrated in FIG. 5 also shows that the diverter ring 10, in the region in which the projection 11 approaches it, at the level of the cross connector 16, has a predetermined lightning diverter path 17 in the form of a relatively small lacquer layer thickness. FIG. 5 also shows that the aluminium ring 8 is passed in a semicircular configuration around the rotor blade root 24 in order to connect both conducting elements 7 together and in order to ensure an electrical operative connection to the lightning rod 9 in the possible angular positions of the rotor blade. At its free end 25 which is brought close to the aluminium ring 8 as far as a predetermined spacing therefrom the lightning rod 9 has a conical tip which Increases the field strength in comparison with the surroundings.

Figure 6:
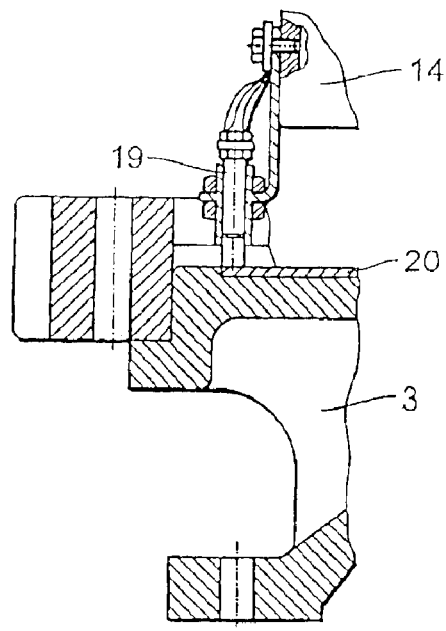
FIG. 6 shows an electrically conductive connection between the machine carrier of the circle labeled 6 in FIG. 3.

FIG. 6 shows an electrically conductive connection between the machine carrier 14 and the upper region of the pylon 3. A horizontally disposed friction disc 20 is arranged in that region of the pylon 3, in coaxial relationship with the axis of rotation of the machine carrier 14. In a region towards the pylon 3 the machine carrier 14 has a lightning diverter element which is in the form of a thrust rod 19 which is acted upon with a contact pressure. The thrust rod 19 is arranged vertically in that region on the machine carrier 14 in such a way that it presses against the friction disc 20 and thus provides an electrically conductive connection. That connection is maintained, even when the machine carrier 14 performs rotary movements, by virtue of the rubbing contact.

A lightning strike on the wind power installation is diverted as follows:

A lightning strike on a rotor blade 5 is firstly diverted into the machine carrier 14. Starting from the shaped aluminium portion 6 or a conducting element 7, the lightning is diverted by way of the conducting elements 7 into the aluminium ring 8. Irrespective of the instantaneous rotor blade angle, the lightning is then conducted from the aluminium ring 8 by way of the lightning rod 9 into the diverter ring 10. The lightning is passed into the machine carrier 14 by way of conductive connections (not shown), by way of the predetermined lightning diverter path 17 of the diverter ring 10.

A lightning strike on the additional lightning rod 12 is likewise passed into the machine carrier 14 by way of the connection 13.

Lightning is diverted from the machine carrier 14 into the pylon 3 by way of the thrust rod 19 and the friction disc 20 which are in rubbing contact. Lightning diversion is thus guaranteed independently of the instantaneous rotary position of the machine carrier 14.

Further lightning diversion is effected by way of the pylon 3, the foundations 4 and the ring earther 27 extending into the ground.

As described the invention shows how on the one hand continuous discharge of electrostatic charges from a rotor blade can take place in an excellent fashion, but also on the other hand how lightning strikes on the rotor blade can be carried away without causing damage to the wind power installation. While the electrostatic charges are directly removed by way of the static diverter and by way of the hub, charges which originate from a lightning strike are carried away past the hub, in particular past the bearing of the hub. The lines for electrostatic charges and also lightning currents from the rotor blade tip to the rotor blade root region can be the same. However, to protect the wind power installation, it is necessary to provide that lightning strikes are not carried by way of the hub or the bearings of the hub.

The separation of the various charge paths for the electrostatic charge on the one hand and lightning currents on the other hand is extremely effective and it was possible for it to be very successfully tested in relation to wind power installations. The expenditure overall is low.

It is possible with the invention for interference effects which could originate on the one hand from electrostatic charging of the rotor blades or also from a lighting strike to be markedly reduced. The particular combination of diversion of electrostatic currents and lightning currents by way of different conduction paths has proven to be extremely successful in several installations.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A wind power installation comprising:
   an arrangement for continuously discharging electrostatic charging of at least one rotor blade of the wind power installation, wherein the continuous discharging arrangement comprises a series circuit of an ohmic resistor and an inductor and the circuit electrically connects the rotor blade to an earthing connection.

2. A wind power installation according to claim 1 characterised in that the continuous discharging arrangement is connected in parallel with a spark gap of a lightning protection system of the wind power installation.

3. A wind power installation according to claim 2, characterised in that the ohmic resistor has a resistance of 50 kΩ.

4. A wind power installation according to claim 2, characterised in that the inductor has 10 µH.

5. A wind power installation according to claim 1 characterised in that the ohmic resistor has a resistance of at least 10 kΩ.

6. A wind power installation according to claim 1 characterised in that the inductor is at least 2 µH.

7. A wind power installation according to claim 1 characterised in that the inductor comprises a wound wire resistor.

8. A wind power installation according to claim 1 characterised in that the ohmic resistor comprises a wire resistor.

9. A wind power installation according to claim 1 characterised in that the arrangement for continuously discharging electrostatic charge is electrically connected at one end to the electrical lightning diverter connection of the rotor blade and at the other end is in direct contact with the connection of the rotor blade.

10. A wind power installation according to claim 9 characterised in that charges which are carried away by way of the arrangement for continuously discharging electrostatic charge are carried away by way of the hub of the wind power installation.

11. A wind power installation according to claim 1 characterised by a machine carrier which is arranged rotatably on a substructure, having a rotor shaft mounted on the machine carrier, with a rotor hub, with at least one rotor blade, and with a lightning protection transfer conduction means from the rotor blades to a stationary, electrically conductive component of the machine carrier which is earthed, wherein the lightning protection transfer conduction means is in the form of a lightning diverter member which is arranged in the region of the rotor blade root at an insulation spacing relative to the rotor hub and which is electrically operatively connected to the rotor blade root and which has a transfer projection which is moved close as far as a predetermined spacing to the stationary electrically conductive component of the machine carrier.

12. A wind power installation according to claim 11 characterised in that the conductive element arranged on the rotor blade root is an aluminium ring which extends horizontally at least in a portion-wise manner around the rotor blade root on the surface thereof.

13. A wind power installation according to claim 11 characterised in that the lightning diverter member is a lightning rod.

14. A wind power installation according to claim 13 characterised in that the stationary, electrically conductive component of the machine carrier is a diverter ring arranged coaxially with respect to the rotor shaft and that the ring in its region towards the transfer projection has a predetermined lightning diverter path.

15. A wind power installation according to claim 14 characterised in that the lightning rod, with its free end which is remote from the transfer projection, is moved close to a predetermined spacing to an electrical conductive element arranged on the rotor blade root.

16. A wind power installation according to claim 1 having a machine carrier which is arranged rotatably on a substructure, with a rotor shaft mounted on the machine carrier with a rotor hub and with at least one rotor blade, characterised in that each rotor blade has at its tip and at an insulation spacing relative to the rotor hub electrical conductive elements which are arranged on its rotor blade root and which are electrically conductively connected to each other.

17. A wind power installation according to claim 16 characterised in that the conductive element arranged at the tip of the rotor blade is in the form of an aluminium shaped portion.

18. A wind power installation according to claim 17 characterised in that arranged in the leading edge and the trailing edge of each rotor blade are electrical conductive elements which electrically conductively connect the conductive elements arranged at the tip of the rotor blade and on its rotor blade root.

19. A wind power installation according to claim 1 having a machine carrier which is arranged rotatably on a substructure, with a rotor shaft mounted on the machine carrier with a rotor hub and with at least one rotor blade, characterized in that arranged in a region of the machine carrier, which is towards the substructure, is a lightning diverter element which is in rubbing contact with an electrically conductive element of the substructure.

20. A wind power installation according to claim 19 characterised in that the lightning diverter element is in the form of a thrust rod which is subjected to the action of a contact pressure.

21. A wind power installation according to claim 20 characterised in that the electrically conductive element of the substructure is a friction disc which is arranged lying in the upper region of the substructure in a horizontal plane and in coaxial relationship with the axis of rotation of the machine carrier.

22. A wind power installation according to claim 20 characterised in that the rotor blade comprises an electrical non-conductor material such as for example glass fibre-reinforced plastic material.

23. A wind power installation with an arrangement for discharging electrostatic charges of at least one rotor blade of a wind power installation and a lightning protection device with a lightning diverter member, wherein the wind power installation has a rotor hub and rotor blades fixed thereto and in the region of the rotor blade hub the electrostatic charges are carried away by way of a different path from charges which occur with lightning, wherein the electrostatic charges are carried away by way of the hub and the charges occurring with lightning are carried away past the hub.

* * * * *